(12) United States Patent
Rico Alvarino et al.

(10) Patent No.: US 11,917,602 B2
(45) Date of Patent: Feb. 27, 2024

(54) EMISSION SPECIFICATIONS FOR NTN

(71) Applicant: QUALCOMM Incorporated, San Diego, CA (US)

(72) Inventors: Alberto Rico Alvarino, San Diego, CA (US); Liangping Ma, San Diego, CA (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 207 days.

(21) Appl. No.: 17/473,909

(22) Filed: Sep. 13, 2021

(65) Prior Publication Data
US 2022/0116926 A1  Apr. 14, 2022

Related U.S. Application Data
(60) Provisional application No. 63/090,089, filed on Oct. 9, 2020.

(51) Int. Cl.
| | |
|---|---|
| *H04W 72/044* | (2023.01) |
| *H04B 7/185* | (2006.01) |
| *H04W 72/23* | (2023.01) |
| *H04W 84/04* | (2009.01) |

(52) U.S. Cl.
CPC ...... *H04W 72/046* (2013.01); *H04B 7/18504* (2013.01); *H04B 7/18539* (2013.01); *H04W 72/23* (2023.01); *H04W 84/042* (2013.01)

(58) Field of Classification Search
CPC .......................... H04W 72/046; H04W 72/0473
See application file for complete search history.

(56) References Cited

U.S. PATENT DOCUMENTS
| | | | |
|---|---|---|---|
| 9,094,985 | B2 | 7/2015 | Kim et al. |
| 10,656,281 | B2 | 5/2020 | Hamzeh et al. |
| 11,026,233 | B2 | 6/2021 | Zhang et al. |
| 2014/0105054 | A1 | 4/2014 | Sægrov et al. |
| 2016/0241328 | A1 | 8/2016 | Kang et al. |
| 2019/0074854 | A1 | 3/2019 | Raghavan et al. |
| 2020/0288412 | A1 | 9/2020 | Ajdakple et al. |

FOREIGN PATENT DOCUMENTS
| | | | | |
|---|---|---|---|---|
| WO | 2017160390 A1 | 9/2017 | | |
| WO | 2018175784 A1 | 9/2018 | | |
| WO | WO-2020184954 A1 * | 9/2020 | ........... | H04L 1/0003 |

OTHER PUBLICATIONS
International Search Report and Written Opinion—PCT/US2021/050298—ISA/EPO—dated Jan. 18, 2022.

* cited by examiner

*Primary Examiner* — Kevin Kim
(74) *Attorney, Agent, or Firm* — Procopio, Cory, Hargreaves & Savitch LLP

(57) ABSTRACT

In an aspect of the disclosure, a method, a computer-readable medium, and an apparatus of a user equipment (UE) are provided. The UE may receive, from a base station, an indication of an emission specification for each of one or more beams, the emission specification for each of the one or more beams being associated with an NTN. The UE may communicate, with the base station via the one of the one or more beams, based on the emission specification for the one or more beams.

30 Claims, 13 Drawing Sheets

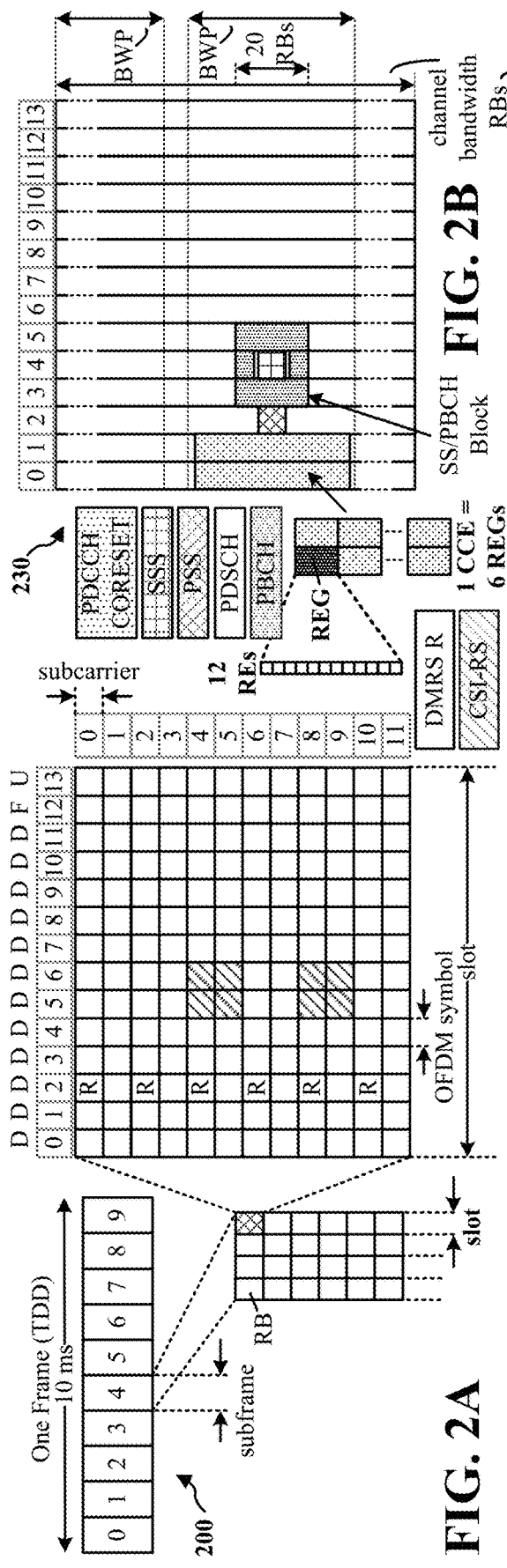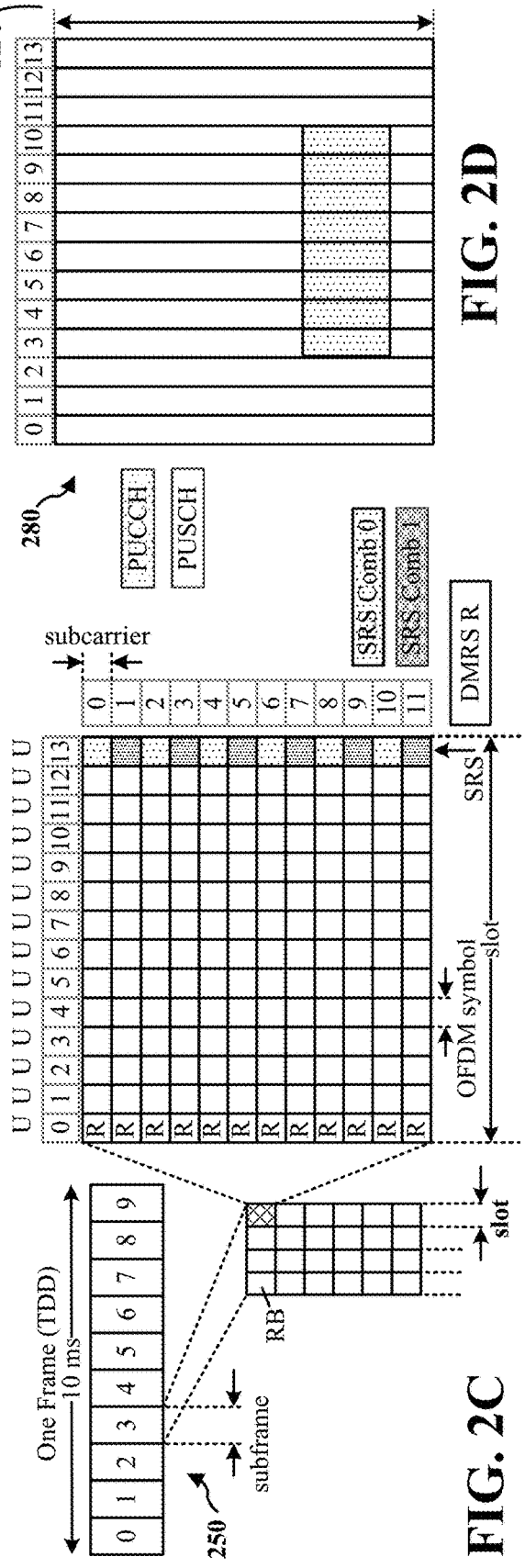
FIG. 2A  FIG. 2B  FIG. 2C  FIG. 2D

EMISSION SPECIFICATIONS FOR NTN

CROSS REFERENCE TO RELATED APPLICATION(S)

This application claims the benefit of and priority to U.S. Provisional Application Ser. No. 63/090,089, entitled "EMISSION SPECIFICATIONS FOR NTN" and filed on Oct. 9, 2020, which is expressly incorporated by reference herein in its entirety.

TECHNICAL FIELD

The present disclosure relates generally to communication systems, and more particularly, to wireless communication systems with a non-terrestrial network (NTN).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus of a user equipment (UE) are provided. The UE may receive, from a base station, an indication of an emission specification for each of one or more beams. The emission specification for each of the one or more beams may be associated with an NTN. The UE may communicate, with the base station via the one of the one or more beams, based on the emission specification for the one or more beams.

In another aspect of the disclosure, a method, a computer-readable medium, and an apparatus of a base station are provided. The base station may signal, to a UE, an indication of an emission specification for each of one or more beams. The emission specification for each of the one or more beams may be associated with an NTN. The base station may communicate, with the UE via one of the one or more beams, based on the emission specification for the one or more beams.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
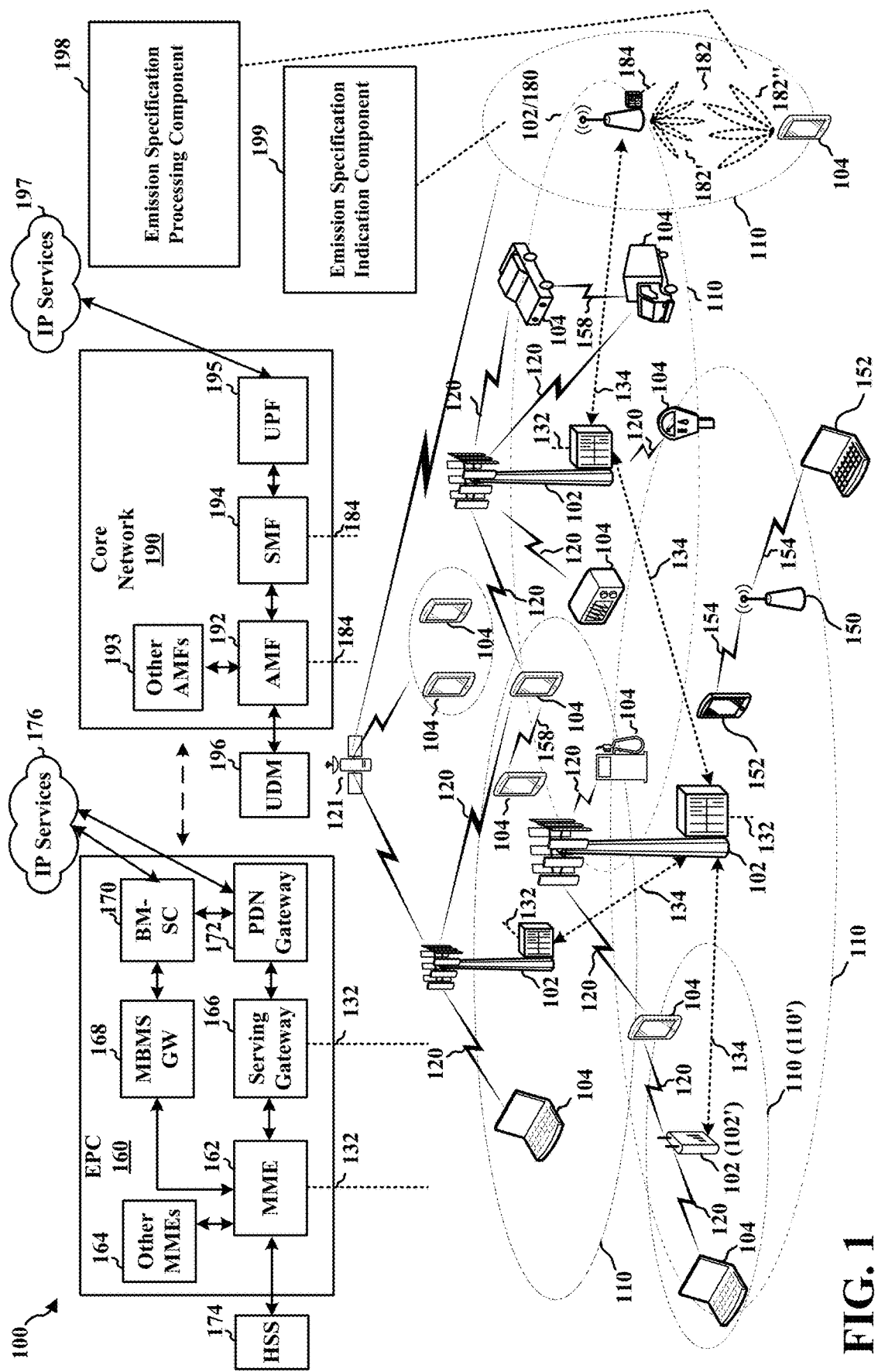
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

In some aspects, the base station 102 may communicate with the UE 104 via a satellite 121. In some aspects, the satellite 121 may be a transparent satellite that performs one or more of amplification, filtering, and frequency conversion. In some aspects where the satellite 121 is a transparent satellite, the satellite 121 may receive signals from the base station 102 and relay, such as by performing amplify-and-forward relay, the signal to one or more UEs 104. The satellite 121 may also receive signals from one or more UEs 104 and relay, such as by performing amplify- and forward relay, the signal to the base station 102. The communication link between the satellite 121 and the base station 102 may be referred to as a feeder link. In some aspects, the satellite 121 may be a non-transparent satellite that may be capable of performing one or more aspects performed by the base station 102. In some aspects, the satellite 121 may be a base station and may be connected to the core network 190. The satellite 121 may be other instances of an NTN network entity such as a high altitude platform station (HAPS). The satellite 121 may be referred to as an "NTN network entity".

Referring again to FIG. 1, in certain aspects, the UE 104 may include an emission specification processing component 198. The emission specification processing component 198 may receive, from a base station, an indication of an emission specification for each of one or more beams. The emission specification for each of the one or more beams may be associated with an NTN. The emission specification processing component 198 may communicate, with the base station via the one of the one or more beams, based on the emission specification for the one or more beams.

In certain aspects, the base station 180 may include an emission specification indication component 199. The emission specification indication component 199 may signal, to a UE, an indication of an emission specification for each of one or more beams. The emission specification for each of the one or more beams may be associated with an NTN. The emission specification indication component 199 may communicate, with the UE via one of the one or more beams, based on the emission specification for the one or more beams.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 µs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
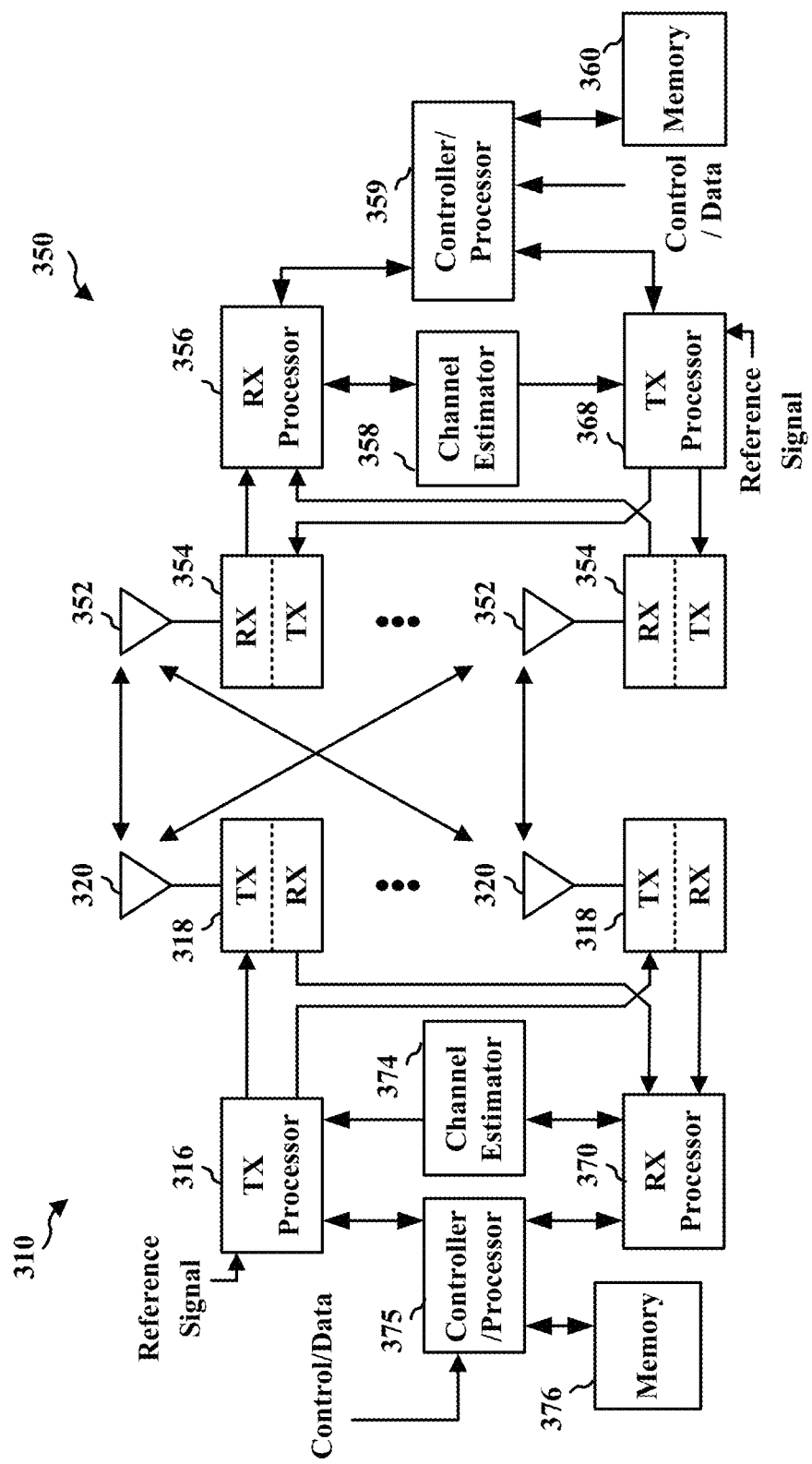
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the emission specification processing component 198 of FIG. 1.

At least one of the TX processor 316, the RX processor 370, and the controller/processor 375 may be configured to perform aspects in connection with the emission specification indication component 199 of FIG. 1.

Figure 4:
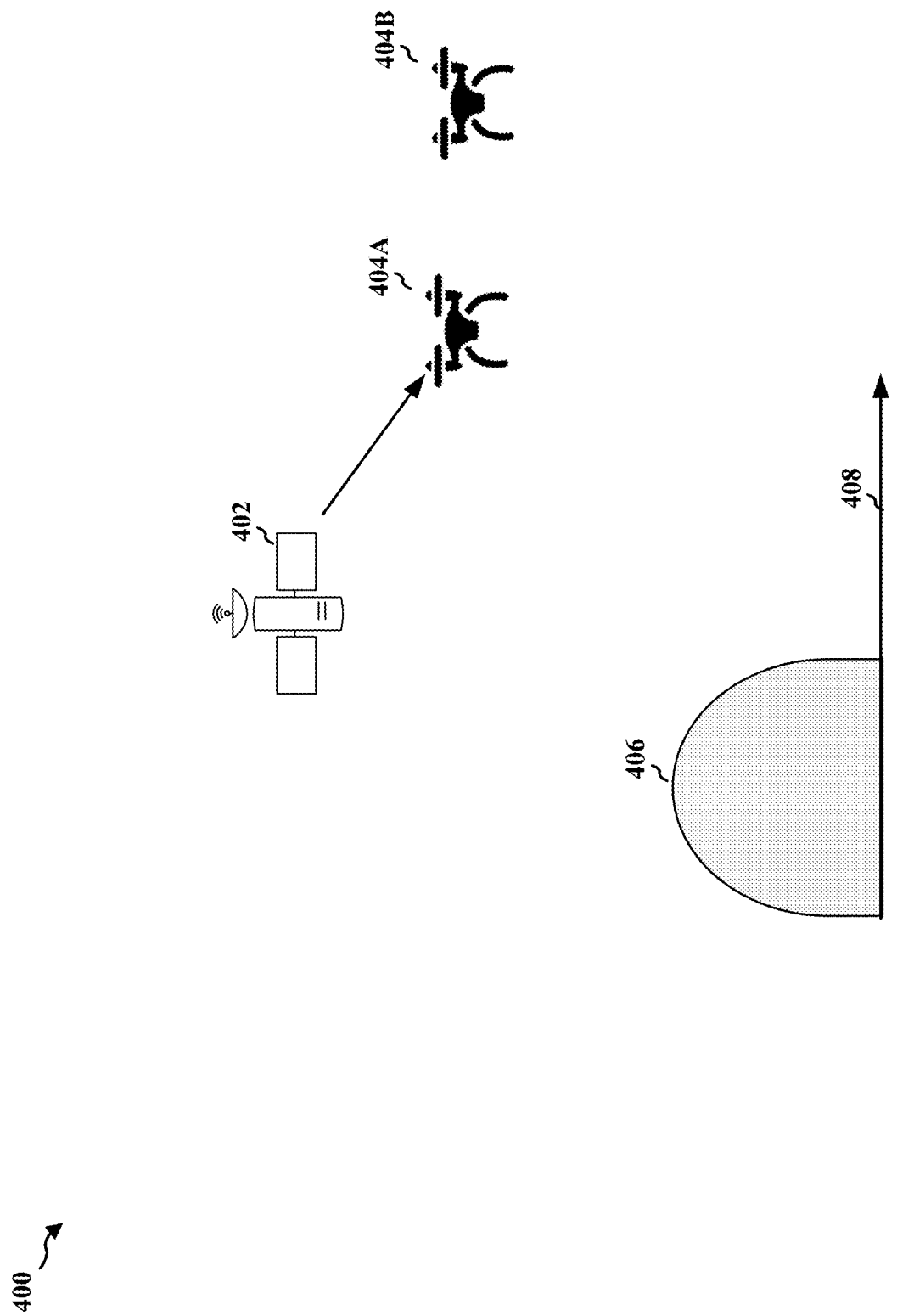
FIG. 4 illustrates an example satellite communicating with UEs.

NTN networks utilizing satellites may be integrated in wireless communication systems, such as 5G communication systems to facilitate the communication between a base station and a UE. For example, a transparent satellite that performs amplification, spatial filtering, or frequency conversion may relay communication transmitted from a base station to UEs. The transparent satellite may perform amplification, spatial filtering, or frequency conversion after receiving a signal and without decoding the signal. In another example, a non-transparent satellite may serve as a 5G base station. Some satellites may use frequencies that overlap with frequencies used by incumbent spectrum users. For example, as illustrated in example 400 of FIG. 4, 1610.6 MHz-1613.8 MHz may be used for the uplink transmissions between a satellite 402 and one or more UEs 404A and 404B. 1610.6 MHz-1613.8 MHz may also be used for radio astronomy site 406, and a separation distance around a radius 408 (e.g., 100 miles) for the radio astronomy site 406 may be implemented accordingly. In some aspects, the one or more UEs 404A and 404B may be drones, airplanes, balloons, ground-based handheld devices, or ground-based very small aperture terminal (VSAT) terminals.

To communicate with a satellite, some UEs may use a directional antenna which may cause interference that may be significant to ground spectrum users in the direction of the antenna radiation direction and may be negligible to other ground spectrum users. A UE with an omnidirectional antenna may cause relatively strong interference to ground spectrum users.

Figure 5:
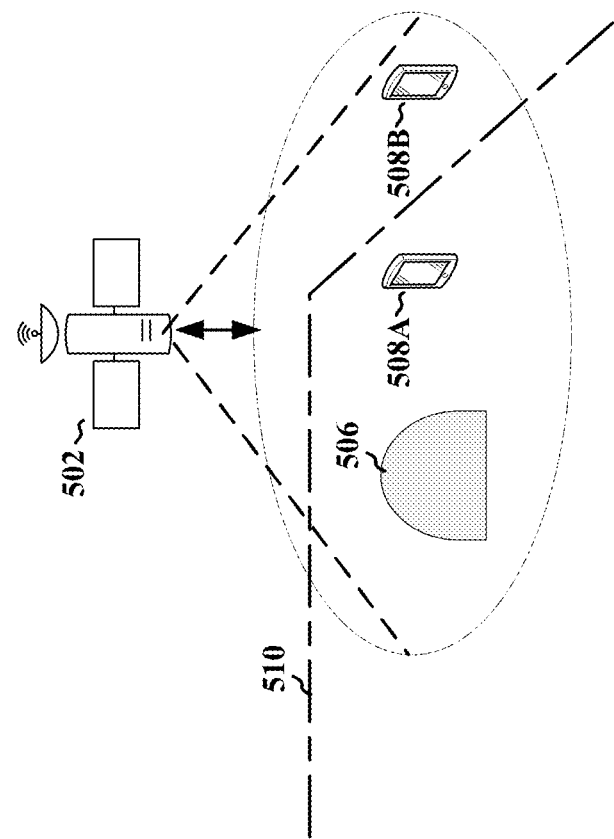
FIG. 5 illustrates an example satellite communicating with UEs.

In a NTN, a satellite beam may cover a large area. For example, the distances of UEs from a victim (i.e., an interference victim such as a radio astronomy site) may be different enough to facilitate different spectrum emission specifications. For example, as illustrated in example 500 of FIG. 5, a UE 508A communicating with a satellite 502 that is closer to a radio astronomy site 506 may be subject to a more stringent emission specification than a UE 508B that is further away from the radio astronomy site 506. Moreover, the UE 508B may be in a different country separated by a border 510, where different countries may have different emission specifications.

Figure 6:
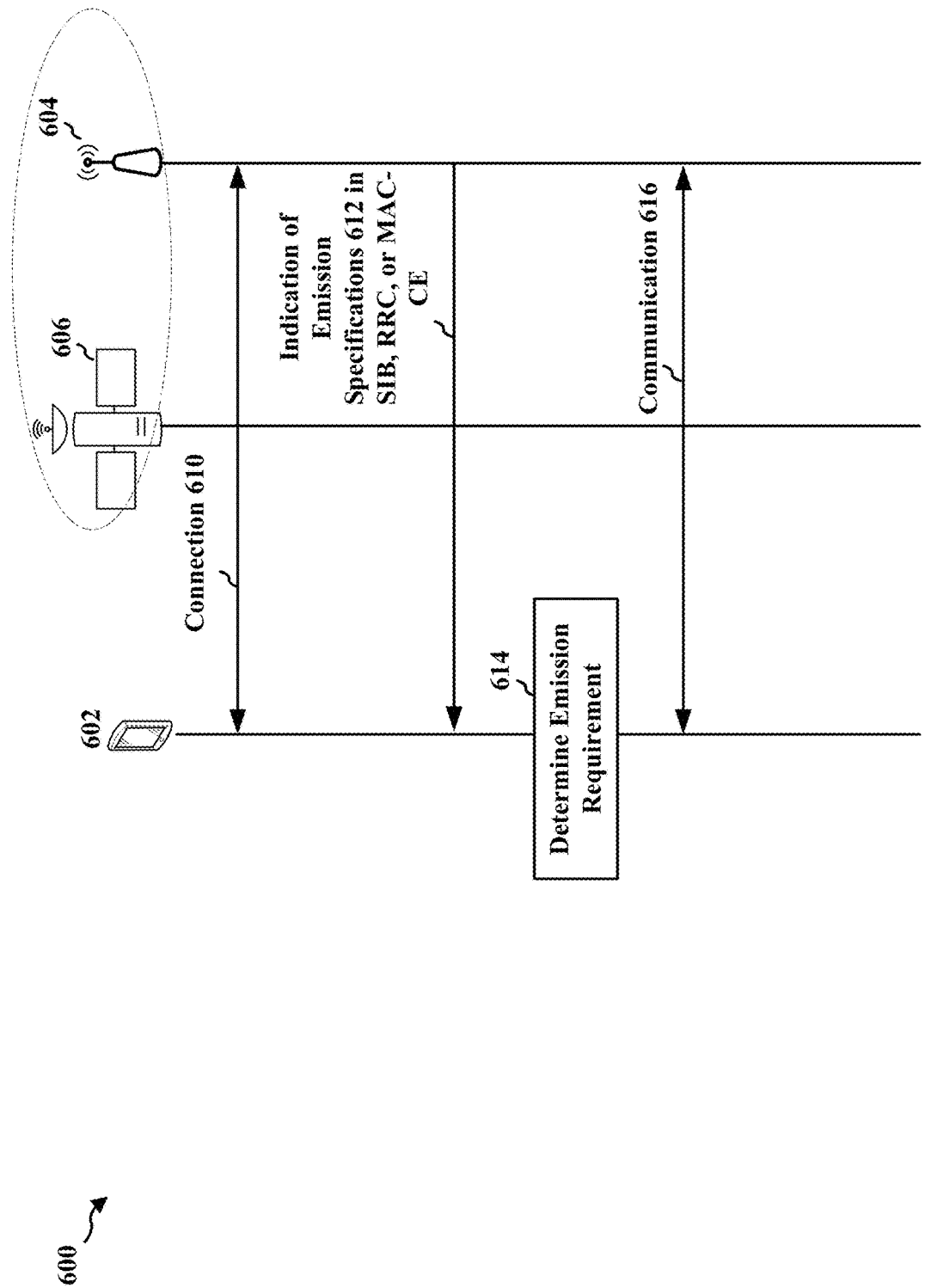
FIG. 6 illustrates example communications between a UE and a base station.

FIG. 6 illustrates example communications 600 between a UE 602 and a base station 604 to address the different emission specifications. In some aspects, the UE 602 and the base station 604 may communicate via an NTN entity such as a satellite 606. In some aspects, the base station 604 may be implemented on satellite 606. As illustrated in FIG. 6, at 610, the base station 604 may have established connection 610, such as a radio resource control (RRC) connection, with the UE 602. The base station may transmit an indication of emission specifications 612 to the UE 602. The indication of emission specifications 612 may be transmitted via a system information block (SIB), an RRC message, or a medium access control (MAC) control element (MAC-CE). The indication of emission specifications 612 may include a set of emission specifications that each includes at least one of the following: a spectrum emission mask, a maximum power, an additional maximum power, an allowed maximum power reduction, an additional maximum power reduction, or the like. In some aspects, each beam (that may be identified by an index such as one of, or a combination of, a synchronization signal block (SSB) index, a physical cell identity, a satellite index, and a satellite beam index) may be associated with a different emission specification in the set of emission specifications.

Figure 7:
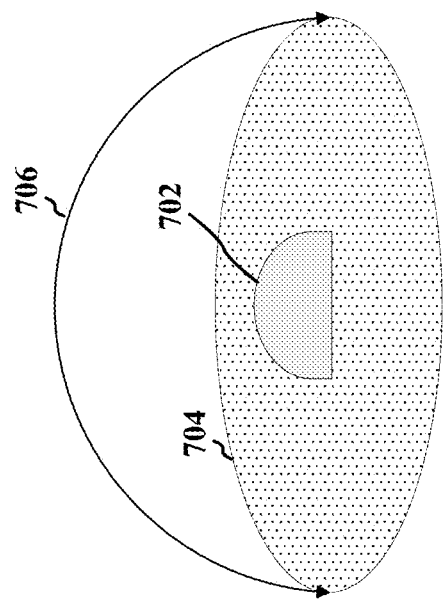
FIG. 7 illustrates an example geofencing area and an example geofencing volume.

In some aspects, the indication of emission specifications 612 may further include the locations of victims, such as radio astronomy sites, and a geofencing area or a geofencing volume for each victim. Example 700 in FIG. 7 illustrates example geofencing volume 706 and geofencing area 704 associated with a victim 702.

In some aspects, the indication of emission specifications 612 may indicate several geographical areas or countries (e.g., such as by including public and mobile network PLMN identifiers associated with the geographical areas or countries). In some aspects, the UE 602 may be within a beam that may belong to multiple PLMNs and the emission specification for each beam may include separate emission specifications for each geographical area, country (which may be identified by a mobile country code (MCC)), or PLMN. The UE 602 may determine, at 614, a PLMN to join based on the UE 602's location, altitude (relative to the ground), antenna type, antenna direction/angle, the locations of the victims, or the like. For example, a more stringent emission specification may be applied if an antenna boresight becomes less than a configured angle relative to the direction of a victim. In another example, a more stringent emission specification may be applied if the UE is above the ground for more than a threshold.

After determining the emission specification, the UE 602 may communicate, at 616, with the base station 604/the satellite 606 based on the determined emission specification. In some aspects, if each beam of the satellite 606 is configured as a separate cell, the indication of emission specifications 612 may also include emission specifications for other cells belonging to the same satellite 606 or a different satellite. If all of the beams from the satellite 606 are configured as a same cell, the indication of emission specifications 612 may include indications for all of the beams from the satellite 606 and emission specifications of beams from other satellites. In some aspects, the UE may switch from one of the one or more beams to another of the one or more beams based on the indication.

Figure 8:
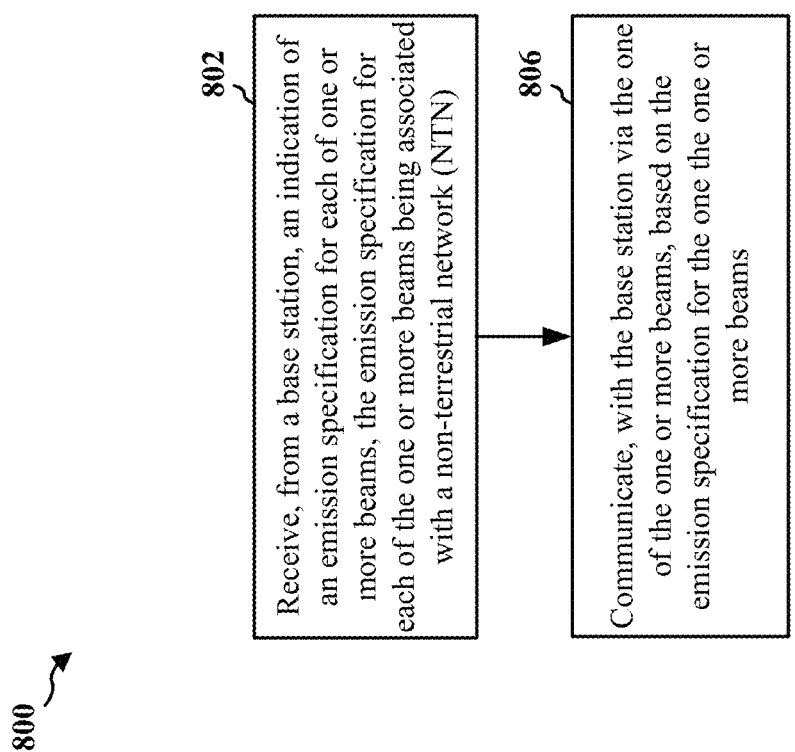
FIG. 8 is a flowchart of a method of wireless communication.

FIG. 8 is a flowchart 800 of a method of wireless communication. The method may be performed by a UE (e.g., the UE 104, the UE 404A/404B, the UE 602; the apparatus 1202). At 802, the UE may receive, from a base station, an indication of an emission specification for each of one or more beams. The emission specification for each of the one or more beams may be associated with an NTN. For example, the UE 602 may receive, from a base station 604, an indication of an emission specification 612 for each of one or more beams. Further, the reception 802 may be performed by reception component 1230 in FIG. 12. In some aspects, the emission specification may be different for each of the one or more beams. In some aspects, the emission specification for each of the one or more beams may be preconfigured or predetermined. In some aspects, the emission specification includes at least one of: a spectrum emission mask, a maximum power, an additional maximum power, an allowed maximum power reduction, or an additional maximum power reduction. In some aspects, the indication may be received via a SIB, an RRC message, or a MAC-CE. In some aspects, each of the one or more beams may be identified by an index. In some aspects, the index may be one or a combination of a synchronization signal block index, a physical cell identity, an NTN network entity identity, and an NTN network entity beam index. The NTN network entity may be a satellite or a high altitude platform station.

In some aspects, the indication may indicate one or more locations of one or more victims. In some aspects, the indication further may include one or more geofencing areas or one or more geofencing volumes of the one or more victims. In some aspects, the indication may indicate one or more geographical areas. In some aspects, the one or more geographical areas are identified by one or more PLMNs. In some aspects, the UE may be associated with multiple PLMNs and each of the multiple PLMNs may be associated with the emission specification for an associated beam of the one or more beams. In some aspects, a first set of beams of the one or more beams may be associated with a first NTN network entity, the first set of beams being configured as a same cell, and where the one or more beams may further include a second set of beams associated with a second NTN network entity.

At 806, the UE may communicate, with the base station via the one of the one or more beams, based on the emission specification for the one or more beams. For example, the UE 602 may communicate, with the base station 604 (e.g., by exchanging communication 616) via the one of the one or more beams, based on the emission specification for the one or more beams. Further, the communication 806 may be performed by reception component 1230 in FIG. 12. In some aspects, before communicating, the UE or the base station may switch from one of the one or more beams to another of the one or more beams based on the indication. For example, the communication 806 may satisfy the determined emission specification.

Figure 9:
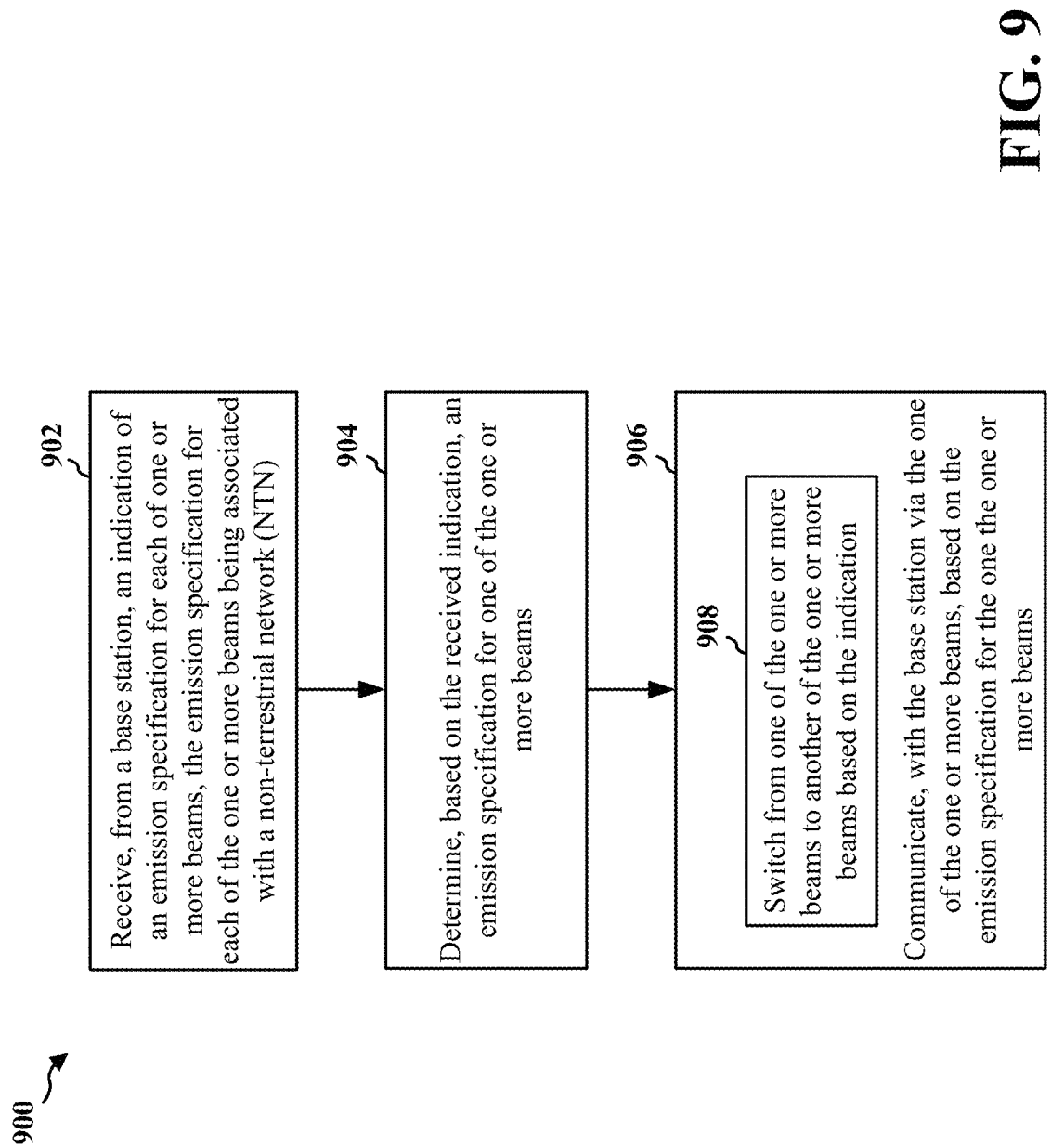
FIG. 9 is a flowchart of a method of wireless communication.

FIG. 9 is a flowchart 900 of a method of wireless communication. The method may be performed by a UE (e.g., the UE 104, the UE 404A/404B, the UE 602; the apparatus 1202). At 902, the UE may receive, from a base station, an indication of an emission specification for each of one or more beams. The emission specification for each of the one or more beams may be associated with an NTN. For example, the UE 602 may receive, from a base station 604, an indication of an emission specification 612 for each of one or more beams. Further, the reception 902 may be performed by reception component 1230 in FIG. 12. In some aspects, the emission specification may be different for each of the one or more beams. In some aspects, the emission specification for each of the one or more beams may be preconfigured or predetermined. In some aspects, the emission specification includes at least one of: a spectrum emission mask, a maximum power, an additional maximum power, an allowed maximum power reduction, or an additional maximum power reduction. In some aspects, the indication may be received via a SIB, an RRC message, or a MAC-CE. In some aspects, each of the one or more beams may be identified by an index. In some aspects, the index may be one or a combination of a synchronization signal block index, a physical cell identity, an NTN network entity identity, and an NTN network entity beam index. The NTN network entity may be a satellite or a high altitude platform station.

In some aspects, the indication may indicate one or more locations of one or more victims. In some aspects, the indication further may include one or more geofencing areas or one or more geofencing volumes of the one or more victims. In some aspects, the indication may indicate one or more geographical areas. In some aspects, the one or more geographical areas are identified by one or more PLMNs. In some aspects, the UE may be associated with multiple PLMNs and each of the multiple PLMNs may be associated with the emission specification for an associated beam of the one or more beams. In some aspects, a first set of beams of the one or more beams may be associated with a first NTN network entity, the first set of beams being configured as a same cell, and where the one or more beams may further include a second set of beams associated with a second NTN network entity.

At 904, the UE may determine, based on the received indication, an emission specification for one of the one or more beams. For example, the UE 602 may determine, based on the received indication, an emission specification for one of the one or more beams. The determination 904 may be performed by an emission specification determination component 1242 illustrated in FIG. 12. In some aspects, the determining may be further based on at least one of a location, an altitude, an antenna type, an antenna direction, or one or more locations of one or more victims. In some aspects, each of the one or more beams is configured as a separate cell, and where the indication may be associated with one or more cells of a same NTN network entity.

At 906, the UE may communicate, with the base station via the one of the one or more beams, based on the emission specification for the one or more beams. For example, the UE 602 may communicate, with the base station 604 (e.g., by exchanging communication 616) via the one of the one or more beams, based on the emission specification for the one or more beams. Further, the communication 906 may be performed by reception component 1230 in FIG. 12. In some aspects, before communicating, at 908, the UE or the base station may switch from one of the one or more beams to another of the one or more beams based on the indication. For example, the communication 906 may satisfy the determined emission specification.

Figure 10:
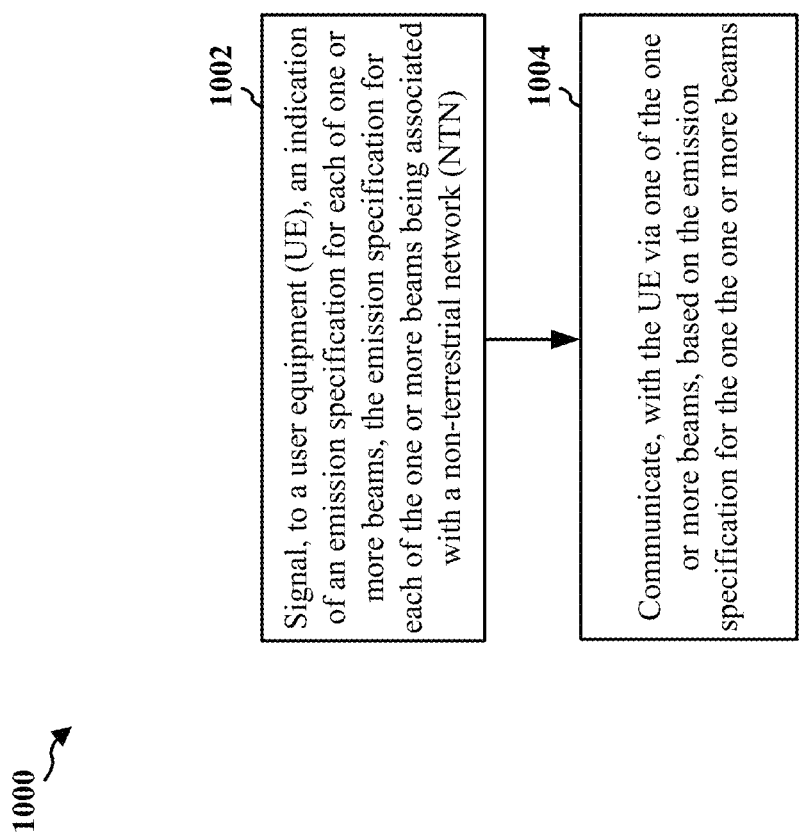
FIG. 10 is a flowchart of a method of wireless communication.

FIG. 10 is a flowchart 1000 of a method of wireless communication. The method may be performed by a base station (e.g., the base station 102/180, the base station 604; the apparatus 1302.

At 1002, the base station may signal, to a UE, an indication of an emission specification for each of one or more beams. The emission specification for each of the one or more beams may be associated with an NTN. For example, the base station 604 may signal, to a UE 602, an indication of an emission specification 612 for each of one or more beams. The signaling 1002 may be performed by an emission specification signaling component 1342 illustrated in FIG. 13. In some aspects, the emission specification may be different for each of the one or more beams. In some aspects, the emission specification for each of the one or more beams may be preconfigured or predetermined. In some aspects, the emission specification may include at least one of: a spectrum emission mask, a maximum power, an additional maximum power, an allowed maximum power reduction, or an additional maximum power reduction. In some aspects, the indication may be transmitted (signaled) via a SIB, an RRC message, or a MAC-CE. In some aspects, each of the one or more beams is identified by an index. In some aspects, the index may be one or a combination of a synchronization signal block index, a physical cell identity, an NTN network entity identity, and an NTN network entity beam index, the NTN network entity being a satellite or a high altitude platform station.

In some aspects, the indication may indicate one or more locations of one or more victims. In some aspects, the indication further may include one or more geofencing areas or one or more geofencing volumes of the one or more victims. In some aspects, the indication may indicate one or more geographical areas. In some aspects, the one or more geographical areas are identified by one or more PLMNs. In some aspects, the UE may be associated with multiple PLMNs and each of the multiple PLMNs is associated with the emission specification for an associated beam of the one or more beams. In some aspects, a first set of beams of the one or more beams may be associated with a first NTN network entity, the first set of beams may be configured as a same cell, and where the one or more beams may further include a second set of beams associated with a second NTN network entity.

At 1004, the base station may communicate, with the UE via one of the one or more beams, based on the emission specification for the one or more beams. For example, the base station 604 may communicate, with the UE 602 (e.g., by exchanging communication 616) via one of the one or more beams, based on the emission specification for the one or more beams. For example, the communication at 1004 may satisfy the determined emission specification. In some aspects, 1004 may be performed by transmission component 1334 of FIG. 13.

Figure 11:
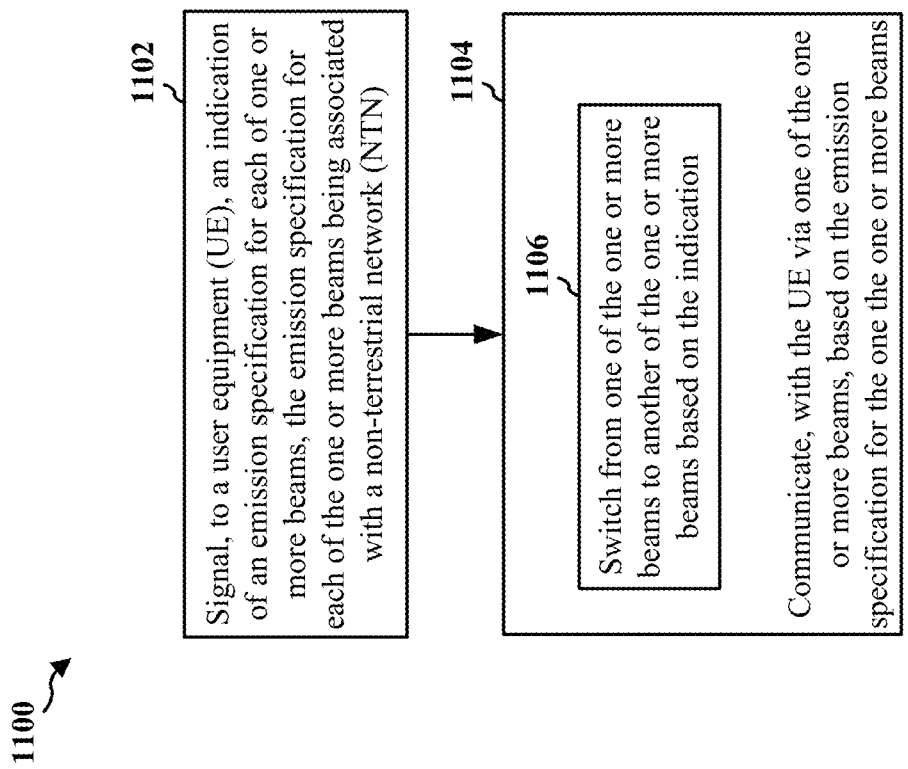
FIG. 11 is a flowchart of a method of wireless communication.

FIG. 11 is a flowchart 1100 of a method of wireless communication. The method may be performed by a base station (e.g., the base station 102/180, the base station 604; the apparatus 1302.

At 1102, the base station may signal, to a UE, an indication of an emission specification for each of one or more beams. The emission specification for each of the one or more beams may be associated with an NTN. For example, the base station 604 may signal, to a UE 602, an indication of an emission specification 612 for each of one or more beams. The signaling 1102 may be performed by an emission specification signaling component 1342 illustrated in FIG. 13. In some aspects, the emission specification may be different for each of the one or more beams. In some aspects, the emission specification for each of the one or more beams may be preconfigured or predetermined. In some aspects, the emission specification may include at least one of: a spectrum emission mask, a maximum power, an additional maximum power, an allowed maximum power reduction, or an additional maximum power reduction. In some aspects, the indication may be transmitted (signaled) via a SIB, an RRC message, or a MAC-CE. In some aspects, each of the one or more beams is identified by an index. In some aspects, the index may be one or a combination of a synchronization signal block index, a physical cell identity, an NTN network entity identity, and an NTN network entity beam index, the NTN network entity being a satellite or a high altitude platform station.

In some aspects, the indication may indicate one or more locations of one or more victims. In some aspects, the indication further may include one or more geofencing areas or one or more geofencing volumes of the one or more victims. In some aspects, the indication may indicate one or more geographical areas. In some aspects, the one or more geographical areas are identified by one or more PLMNs. In some aspects, the UE may be associated with multiple PLMNs and each of the multiple PLMNs is associated with the emission specification for an associated beam of the one or more beams. In some aspects, a first set of beams of the one or more beams may be associated with a first NTN network entity, the first set of beams may be configured as a same cell, and where the one or more beams may further include a second set of beams associated with a second NTN network entity.

At 1104, the base station may communicate, with the UE via one of the one or more beams, based on the emission specification for the one or more beams. For example, the base station 604 may communicate, with the UE 602 (e.g., by exchanging communication 616) via one of the one or more beams, based on the emission specification for the one or more beams. For example, the communication at 1104 may satisfy the determined emission specification. In some aspects, at 1106, the base station may switch from one of the one or more beams to another of the one or more beams based on the indication. In some aspects, 1104 may be performed by transmission component 1334 of FIG. 13.

Figure 12:
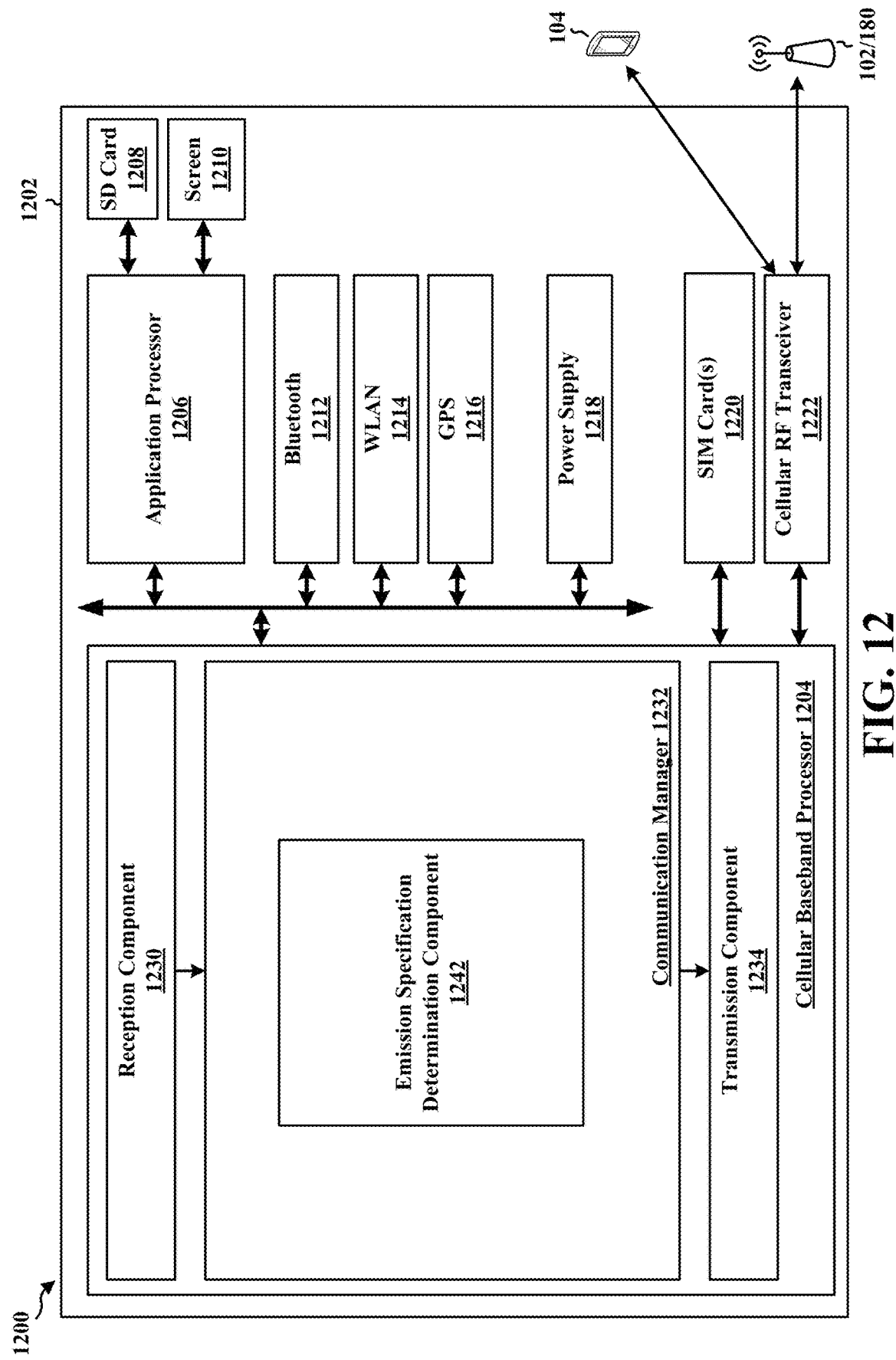
FIG. 12 is a diagram illustrating an example of a hardware implementation for an example apparatus.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. In some aspects, the reception component 1230 may receive, from a base station, an indication of an emission specification for each of one or more beams, the emission specification for each of the one or more beams being associated with an NTN, e.g., as described in connection with 802 in FIG. 8, or 902 in FIG. 9. In some aspects, the reception component 1230 and the transmission component 1234 may communicate, with the base station via the one of the one or more beams, based on the emission specification for the one or more beams, e.g., as described in connection with 806 in FIG. 8, or 906 in FIG. 9. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes an emission specification determination component 1242 that is configured to determine, based on the received indication, an emission specification for one of the one or more beams, e.g., as described in connection with 904 in FIG. 9. In some aspects, the emission specification determination component 1242 may be further configured to receive, from a base station, an indication of an emission specification for each of one or more beams, e.g., as described in connection with 802 in FIG. 8, or 902 in FIG. 9. In some aspects, the emission specification determination component 1242 may be further configured to communicate, with the base station via the one of the one or more beams, e.g., as described in connection with 806 in FIG. 8, or 906 in FIG. 9. In some aspects, the emission specification determination component 1242 may be further configured to switch from one of the one or more beams to another of the one or more beams based on the indication, e.g., as described in connection with 908 in FIG. 9.

The apparatus may include additional components that perform each of the blocks of the algorithm in the aforementioned flowcharts of FIGS. 8-9. As such, each block in the aforementioned flowcharts of FIGS. 8-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, from a base station, an indication of an emission specification for each of one or more beams, the emission specification for each of the one or more beams being associated with an NTN. The cellular baseband processor 1204 may further include means for determining, based on the received indication, an emission specification for one of the one or more beams. The cellular baseband processor 1204 may further include means for communicating, with the base station via the one of the one or more beams, based on the emission specification for the one or more beams. The cellular baseband processor 1204 may further include means for switching from one of the one or more beams to another of the one or more beams based on the indication. The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
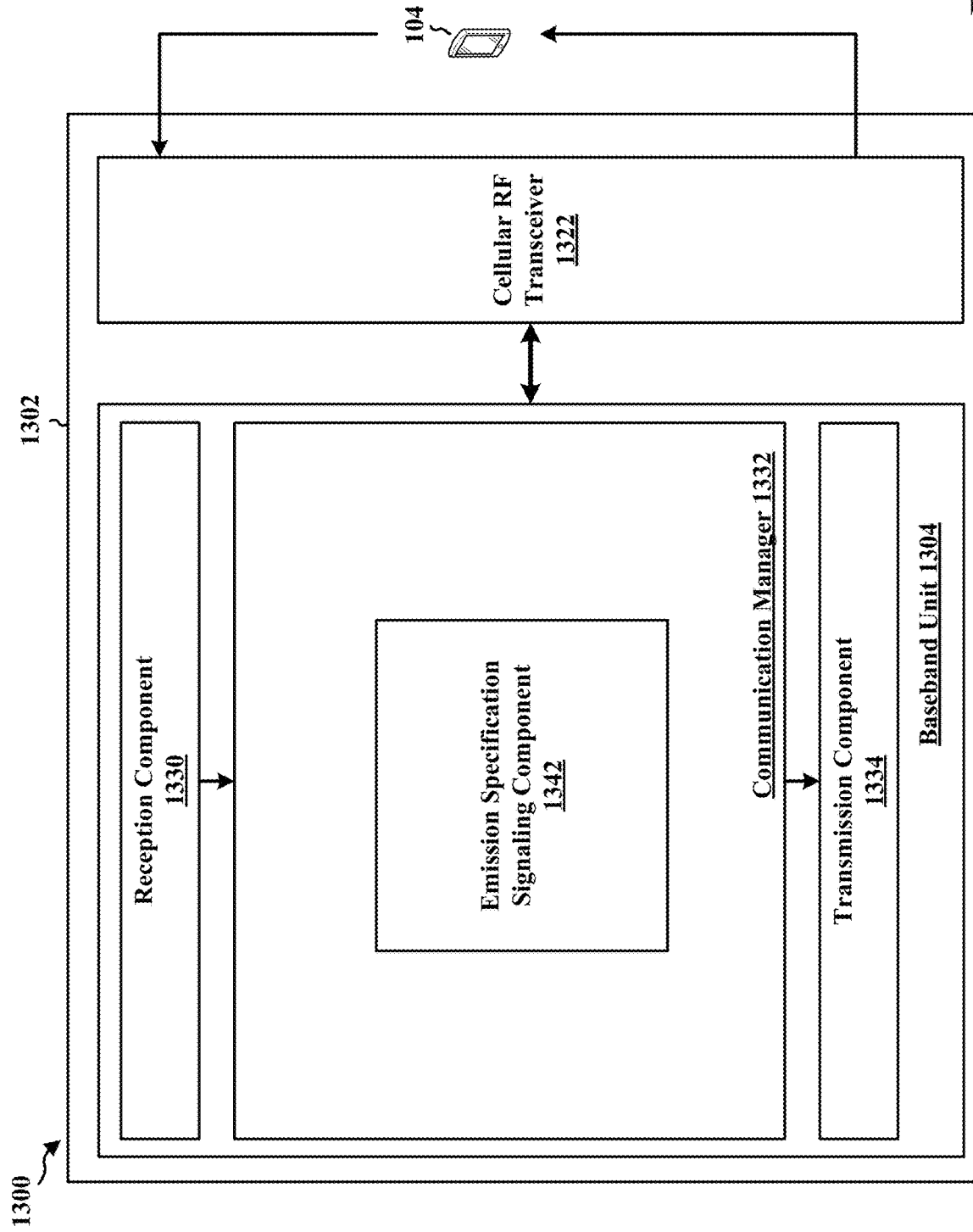
FIG. 13 is a diagram illustrating an example of a hardware implementation for an example apparatus.

FIG. 13 is a diagram 1300 illustrating an example of a hardware implementation for an apparatus 1302. The apparatus 1302 is a BS and includes a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. In some aspects, the reception component 1330 and the transmission component 1334 may communicate, with the UE via one of the one or more beams, based on the emission specification for the one or more beams, e.g., as described in connection with 1004 in FIG. 10, or 1104 in FIG. 11. The communication manager 1332 includes the one or more illustrated components. The components within the communication manager 1332 may be stored in the computer-readable medium/memory and/or configured as hardware within the baseband unit 1304. The baseband unit 1304 may be a component of the BS 310 and may include the memory 376 and/or at least one of the TX processor 316, the RX processor 370, and the controller/processor 375.

The communication manager 1332 includes an emission specification signaling component 1342 that may signal, to a UE, an indication of an emission specification for each of one or more beams, the emission specification for each of the one or more beams being associated with an NTN, e.g., as described in connection with 1002 in FIG. 10, or 1102 in FIG. 11. In some aspects, the emission specification signaling component 1342 may communicate, with the UE via one of the one or more beams, based on the emission specification for the one the one or more beams, e.g., as described in connection with 1004 in FIG. 10, or 1104 in FIG. 11. In some aspects, the emission specification signaling component 1342 may switch from one of the one or more beams to another of the one or more beams based on the indication, e.g., as described in connection with 1106 in FIG. 11.

The apparatus may include additional components that perform each of the blocks of the algorithm in the aforementioned flowcharts of FIGS. 10-11. As such, each block in the aforementioned flowcharts of FIGS. 10-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the baseband unit 1304, includes means for signaling, to a UE, an indication of an emission specification for each of one or more beams, the emission specification for each of the one or more beams being associated with an NTN. The baseband unit 1304 may further include means for communicating, with the UE via one of the one or more beams, based on the emission specification for the one or more beams. The baseband unit 1304 may further include means for switching from one of the one or more beams to another of the one or more beams based on the indication. The aforementioned means may be one or more of the aforementioned components of the apparatus 1302 configured to perform the functions recited by the aforementioned means. As described supra, the apparatus 1302 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: receive, from a base station, an indication of an emission specification for each of one or more beams, the emission specification for each of the one or more beams being associated with a NTN; and communicate, with the base station via the one of the one or more beams, based on the emission specification for the one or more beams.

Aspect 2 is the apparatus of aspect 1, wherein the emission specification is different for each of the one or more beams.

Aspect 3 is the apparatus of any of aspects 1-2, wherein the emission specification for each of the one or more beams is preconfigured or predetermined.

Aspect 4 is the apparatus of any of aspects 1-3, wherein the emission specification comprises at least one of: a spectrum emission mask, a maximum power, an additional maximum power, an allowed maximum power reduction, or an additional maximum power reduction.

Aspect 5 is the apparatus of any of aspects 1-4, wherein the indication is received via a SIB, a RRC message, or a MAC-CE.

Aspect 6 is the apparatus of any of aspects 1-5, wherein each of the one or more beams is identified by an index, wherein the index is one or a combination of a synchronization signal block index, a physical cell identity, an NTN network entity identity, and an NTN network entity beam index, the NTN network entity being a satellite or a high altitude platform station and wherein the index is one or a combination of a synchronization signal block index, a physical cell identity, an NTN network entity identity, and an NTN network entity beam index, the NTN network entity being a satellite or a high altitude platform station.

Aspect 7 is the apparatus of any of aspects 1-6, wherein the indication indicates one or more locations of one or more victims, and, wherein the indication further comprises one or more geofencing areas or one or more geofencing volumes of the one or more victims.

Aspect 8 is the apparatus of any of aspects 1-7, wherein the indication indicates one or more geographical areas, and wherein the one or more geographical areas are identified by one or more PLMNs.

Aspect 9 is the apparatus of any of aspects 1-8, wherein the UE is associated with multiple PLMNs, and wherein each of the multiple PLMNs is associated with the emission specification for an associated beam of the one or more beams.

Aspect 10 is the apparatus of any of aspects 1-9, wherein the emission specification is further based on at least one of a location, an altitude, an antenna type, an antenna direction, or one or more locations of one or more victims.

Aspect 11 is the apparatus of any of aspects 1-10, wherein each of the one or more beams is configured as a separate cell, and wherein the indication is associated with one or more cells of a same NTN network entity.

Aspect 12 is the apparatus of any of aspects 1-11, wherein a first set of beams of the one or more beams is associated with a first NTN network entity, the first set of beams being configured as a same cell, and wherein the one or more beams further include a second set of beams associated with a second NTN network entity.

Aspect 13 is the apparatus of any of aspects 1-12, wherein the at least one processor is further configured to: switch from one of the one or more beams to another of the one or more beams based on the indication.

Aspect 14 is the apparatus of any of aspects 1-13, further comprising a transceiver coupled to the at least one processor.

Aspect 15 is an apparatus for wireless communication at a base station, comprising: a memory; and at least one processor coupled to the memory and configured to: signal, to a UE, an indication of an emission specification for each of one or more beams, the emission specification for each of the one or more beams being associated with a NTN; and communicate, with the UE via one of the one or more beams, based on the emission specification for the one or more beams.

Aspect 16 is the apparatus of aspect 15, wherein the emission specification is different for each of the one or more beams.

Aspect 17 is the apparatus of any of aspects 15-16, wherein the emission specification for each of the one or more beams is preconfigured or predetermined.

Aspect 18 is the apparatus of any of aspects 15-17, wherein the emission specification comprises at least one of: a spectrum emission mask, a maximum power, an additional maximum power, an allowed maximum power reduction, or an additional maximum power reduction.

Aspect 19 is the apparatus of any of aspects 15-18, wherein the indication is transmitted via a SIB, a RRC message, or a MAC-CE.

Aspect 20 is the apparatus of any of aspects 15-19, wherein each of the one or more beams is identified by an index, and wherein the index is one or a combination of a synchronization signal block index, a physical cell identity, an NTN network entity identity, and an NTN network entity beam index, the NTN network entity being a satellite or a high altitude platform station.

Aspect 21 is the apparatus of any of aspects 15-20, wherein the indication indicates one or more locations of one or more victims, and wherein the indication further comprises one or more geofencing areas or one or more geofencing volumes of the one or more victims.

Aspect 22 is the apparatus of any of aspects 15-21, wherein the indication indicates one or more geographical areas, and wherein the one or more geographical areas are identified by one or more PLMNs.

Aspect 23 is the apparatus of any of aspects 15-22, wherein the UE is associated with multiple PLMNs, and wherein each of the multiple PLMNs is associated with the emission specification for an associated beam of the one or more beams.

Aspect 24 is the apparatus of any of aspects 15-23, wherein each of the one or more beams is configured as a separate cell, and wherein the indication is associated with one or more cells of a same NTN network entity.

Aspect 25 is the apparatus of any of aspects 15-24, wherein a first set of beams of the one or more beams is associated with a first NTN network entity, the first set of beams being configured as a same cell, and wherein the one or more beams further include a second set of beams associated with a second NTN network entity.

Aspect 26 is the apparatus of any of aspects 15-25, wherein the at least one processor is further configured to: switch from one of the one or more beams to another of the one or more beams based on the indication.

Aspect 27 is the apparatus of any of aspects 15-26, further comprising a transceiver coupled to the at least one processor.

Aspect 28 is a method of wireless communication for implementing any of aspects 1 to 14.

Aspect 29 is an apparatus for wireless communication including means for implementing any of aspects 1 to 14.

Aspect 30 is a computer-readable medium storing computer executable code, where the code when executed by a processor causes the processor to implement any of aspects 1 to 14.

Aspect 31 is a method of wireless communication for implementing any of aspects 15 to 27.

Aspect 32 is an apparatus for wireless communication including means for implementing any of aspects 15 to 27.

Aspect 33 is a computer-readable medium storing computer executable code, where the code when executed by a processor causes the processor to implement any of aspects 15 to 27.

What is claimed is:

1. An apparatus for wireless communication at a user equipment (UE), comprising:
   memory; and
   at least one processor coupled to the memory and configured to:
   receive, from a base station, an indication of an emission specification for each of one or more beams, the emission specification for each of the one or more beams being associated with a non-terrestrial network (NTN), wherein the indication indicates one or more locations of one or more victims; and
   communicate, with the base station via the one of the one or more beams, based on the emission specification for the one or more beams.

2. The apparatus of claim 1, wherein the emission specification is different for each of the one or more beams.

3. The apparatus of claim 2, wherein the emission specification for each of the one or more beams is preconfigured or predetermined.

4. The apparatus of claim 2, wherein the emission specification comprises at least one of: a spectrum emission mask, a maximum power, an additional maximum power, an allowed maximum power reduction, or an additional maximum power reduction.

5. The apparatus of claim 2, wherein the indication is received via a system information block (SIB), a radio resource control (RRC) message, or a medium access control (MAC) control element (MAC-CE).

6. The apparatus of claim 2, wherein each of the one or more beams is identified by an index, wherein the index is one or a combination of a synchronization signal block index, a physical cell identity, an NTN network entity identity, and an NTN network entity beam index, the NTN network entity being a satellite or a high altitude platform station and wherein the index is one or a combination of a synchronization signal block index, a physical cell identity, an NTN network entity identity, and an NTN network entity beam index, the NTN network entity being a satellite or a high altitude platform station.

7. The apparatus of claim 1, wherein the indication further comprises one or more geofencing areas or one or more geofencing volumes of the one or more victims.

8. The apparatus of claim 1, wherein the indication indicates one or more geographical areas, and wherein the one or more geographical areas are identified by one or more public land mobile networks (PLMNs).

9. The apparatus of claim 8, wherein the UE is associated with multiple PLMNs, and wherein each of the multiple PLMNs is associated with the emission specification for an associated beam of the one or more beams.

10. The apparatus of claim 8, wherein the emission specification is further based on at least one of a location, an altitude, an antenna type, an antenna direction, or one or more locations of one or more victims.

11. The apparatus of claim 1, wherein each of the one or more beams is configured as a separate cell, and wherein the indication is associated with one or more cells of a same NTN network entity.

12. The apparatus of claim 1, wherein a first set of beams of the one or more beams is associated with a first NTN network entity, the first set of beams being configured as a same cell, and wherein the one or more beams further include a second set of beams associated with a second NTN network entity.

13. The apparatus of claim 1, wherein the at least one processor is further configured to:
switch from one of the one or more beams to another of the one or more beams based on the indication.

14. The apparatus of claim 1, further comprising a transceiver coupled to the at least one processor.

15. An apparatus for wireless communication at a base station, comprising:
memory; and
at least one processor coupled to the memory and configured to:
signal, to a user equipment (UE), an indication of an emission specification for each of one or more beams, the emission specification for each of the one or more beams being associated with a non-terrestrial network (NTN), wherein the indication indicates one or more locations of one or more victims; and
communicate, with the UE via one of the one or more beams, based on the emission specification for the one or more beams.

16. The apparatus of claim 15, wherein the emission specification is different for each of the one or more beams.

17. The apparatus of claim 15, wherein the emission specification for each of the one or more beams is preconfigured or predetermined.

18. The apparatus of claim 15, wherein the emission specification comprises at least one of: a spectrum emission mask, a maximum power, an additional maximum power, an allowed maximum power reduction, or an additional maximum power reduction.

19. The apparatus of claim 15, wherein the indication is transmitted via a system information block (SIB), a radio resource control (RRC) message, or a medium access control (MAC) control element (MAC-CE).

20. The apparatus of claim 15, wherein each of the one or more beams is identified by an index, and wherein the index is one or a combination of a synchronization signal block index, a physical cell identity, an NTN network entity identity, and an NTN network entity beam index, the NTN network entity being a satellite or a high altitude platform station.

21. The apparatus of claim 15, wherein the indication further comprises one or more geofencing areas or one or more geofencing volumes of the one or more victims.

22. The apparatus of claim 15, wherein the indication indicates one or more geographical areas, and wherein the one or more geographical areas are identified by one or more public land mobile networks (PLMNs).

23. The apparatus of claim 22, wherein the UE is associated with multiple PLMNs, and wherein each of the multiple PLMNs is associated with the emission specification for an associated beam of the one or more beams.

24. The apparatus of claim 23, wherein each of the one or more beams is configured as a separate cell, and wherein the indication is associated with one or more cells of a same NTN network entity.

25. The apparatus of claim 24, wherein a first set of beams of the one or more beams is associated with a first NTN network entity, the first set of beams being configured as a same cell, and wherein the one or more beams further include a second set of beams associated with a second NTN network entity.

26. The apparatus of claim 15, wherein the at least one processor is further configured to:
switch from one of the one or more beams to another of the one or more beams based on the indication.

27. The apparatus of claim 15, further comprising a transceiver coupled to the at least one processor.

28. A method of wireless communication at a user equipment (UE), comprising:
receiving, from a base station, an indication of an emission specification for each of one or more beams, the emission specification for each of the one or more beams being associated with a non-terrestrial network (NTN), wherein the indication indicates one or more locations of one or more victims; and
communicating, with the base station via the one of the one or more beams, based on the emission specification for the one or more beams.

29. The method of claim 28, wherein the emission specification is different for each of the one or more beams.

30. A method of wireless communication at a base station, comprising:
signaling, to a user equipment (UE), an indication of an emission specification for each of one or more beams, the emission specification for each of the one or more beams being associated with a non-terrestrial network (NTN), wherein the indication indicates one or more locations of one or more victims; and
communicating, with the UE via one of the one or more beams, based on the emission specification for the one or more beams.

* * * * *